United States Patent [19]

Scanlon et al.

[11] Patent Number: 5,049,342
[45] Date of Patent: Sep. 17, 1991

[54] METHOD OF FABRICATING COMPOSITE STRUCTURES

[75] Inventors: John F. Scanlon, Okemos, Mich.; Hossein Saatchi; David W. Okey, both of Rockford, Ill.; John S. Church, Wilmington, Del.; Gary A. Wigell, Lansing, Mich.

[73] Assignee: Sundstrand Corporation, Rockford, Ill.

[21] Appl. No.: 520,975

[22] Filed: May 9, 1990

Related U.S. Application Data

[63] Continuation of Ser. No. 139,007, Dec. 29, 1987, abandoned.

[51] Int. Cl.$^5$ .................... B29C 45/14; B29C 45/16
[52] U.S. Cl. ............................. 264/250; 264/257; 264/261; 264/325
[58] Field of Search .............. 264/257, 250, 258, 251, 264/262, 261, 255, 271.1, 275, 277, 279, 279.1, 324, 325

[56] References Cited

U.S. PATENT DOCUMENTS

| | | | |
|---|---|---|---|
| 4,013,810 | 3/1977 | Long | 428/313.9 |
| 4,025,686 | 5/1977 | Zion | 428/310 |
| 4,032,683 | 6/1977 | Coale | 428/315 |
| 4,102,966 | 7/1978 | Duperray et al. | 264/255 |
| 4,292,101 | 9/1981 | Reichert | 156/156 |
| 4,330,494 | 5/1982 | Iwata | 264/46.2 |
| 4,379,103 | 4/1983 | Doerfling | 264/45.5 |
| 4,405,543 | 9/1983 | Murphy et al. | 264/123 |
| 4,443,507 | 4/1984 | Yamada | 428/114 |
| 4,512,836 | 4/1985 | Tucci | 156/174 |
| 4,543,289 | 9/1985 | Park | 428/304.4 |
| 4,556,529 | 12/1985 | Muser | 264/258 |
| 4,560,523 | 12/1985 | Plumley et al. | 264/257 |
| 4,595,623 | 6/1986 | Du Pont et al. | 428/195 |
| 4,657,717 | 4/1987 | Cattanach | 264/257 |
| 4,676,041 | 6/1987 | Ford | 264/257 |
| 4,728,698 | 3/1988 | Isayev | 264/331.21 |
| 4,806,302 | 2/1989 | Frank | 264/46.8 |
| 4,917,742 | 4/1990 | Watanabe | 264/46.7 |

Primary Examiner—Jay H. Woo
Assistant Examiner—Jeremiah F. Durkin, II
Attorney, Agent, or Firm—Wood, Phillips, Mason, Recktenwald & Vansanten

[57] ABSTRACT

A method of fabricating a composite structure having at least one skin molecularly bonded to a core. A skin is provided of reinforcing fibrous material and a thermoplastic matrix. The skin is thermoformed to the general exterior shape of the composite structure. A core having a thermoplastic matrix complementary to the matrix of the skin is molded into the general shape of the composite structure. The skin and the core are placed in juxtaposition in a final forming mold. A thermoplastic material is injected into the final forming mold under isostatic conditions. The thermoplastic material is complementary to the thermoplastic matrices of the skin and the core.

17 Claims, 1 Drawing Sheet

METHOD OF FABRICATING COMPOSITE STRUCTURES

This application is a continuation of application Ser. No. 139,007, filed Dec. 29, 1987 now abandoned

FIELD OF THE INVENTION

This invention generally relates to a method of fabricating a composite structure and, particularly, to a method of isostatic thermoforming of a composite structure having at least one skin bonded to a core.

BACKGROUND OF THE INVENTION

Composite structures often are fabricated in a laminated array, sometimes including a core, such as of foam, sandwiched between a pair of outer structural skins and bonded thereto by some sort of adhesive. The skins often are reinforced with fibrous material, and the composite structures typically are generally pla ar in geometry due to limits in processing technology. Thermoset resin systems predominantly are used with such composite structures.

Due to labor intensity in processing composite structures of the character described, such as those fabricated from thermosetting resins, the structures usually are relatively expensive. They also are not readily repairable. Fully cured structures offer few free polymer chains for molecular level bonding to a repair material.

On the other hand, thermoplastics are reformable, readily repairable and inherently much more impact-resistant than thermosets. The use of thermoplastics for continuous fiber reinforced structures has, however, been limited by an inability to achieve consolidated structures with suitable dispersion of resin and fiber reinforcements. There is a need for a new and improved method of fabricating advanced composite structures using thermoplastic materials or matrices.

An example of an advanced composite structure with which the invention is readily applicable is shown in copending application Ser. No. 191,250, filed May 6, 1988, assigned to the assignee of this invention, and which is incorporated herein by reference now abandoned. That application involves an irregularly shaped housing, such as for a dynamoelectric machine, and includes various components such as conduits, electrical devices, etc. embedded within the core of the composite structure.

This invention is directed to satisfying the above needs and solving the problems described.

SUMMARY OF THE INVENTION

An object, therefore, of the invention is to provide a new and improved method of fabricating a composite structure embodying extensive use of thermoplastic materials.

In the exemplary embodiment of the invention, the composite structure has at least one skin molecularly bonded to a core. Usually, the core is sandwiched between a pair of skins.

The method includes the steps of providing a skin composed of reinforcing material and a thermoplastic matrix. The skin is thermoformed to the general exterior shape of the composite structure. A core is molded into the general shape of the composite structure, the core having a thermoplastic matrix complementary to the matrix of the skin. The composite structure is final-formed by placing the skin and the core in juxtaposition in a forming mold, and a thermoplastic material is injected into the mold under isostatic conditions. The thermoplastic material is complementary to the thermoplastic matrices of the skin and the core. Therefore, the complementary thermoplastic matrices molecularly bond the entire composite structure into an integral, substantially homogeneous construction.

The reinforcing material of the skin may include such materials as continuous or chopped graphite fibers or other fibrous material which may be woven or braided and interspersed with the thermoplastic matrix. The thermoplastic matrix of the various components may be such as polyetheretherketone or liquid crystal polymer. All of these materials are capable of being advantageously used to molecularly bond the construction in the final forming step wherein the thermoplastic is injected under conditions of pressure and heat.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
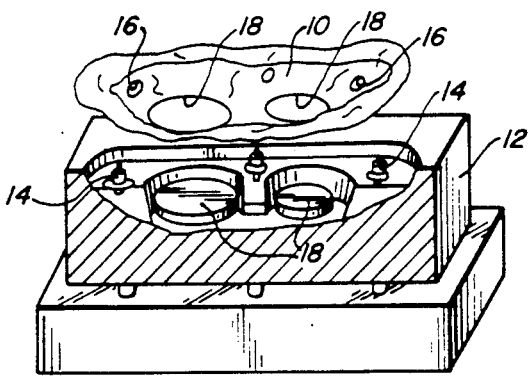
FIG. 1 is a somewhat schematic, perspective view depicting the first step of the method of this invention in thermoforming a skin of the composite structure.

Referring to the drawings in greater detail, the invention is directed to a method of fabricating a composite structure having at least one skin molecularly bonded to a core. To that end, and referring to FIG. 1, the method includes providing a skin 10 composed of reinforcing material and a thermoplastic matrix. Preferably, the reinforcing material is a fibrous material such as a chopped, woven or braided fabric. The material may be of graphite, glass or like fibers. The thermoplastic matrix may be of polyetheretherketone, liquid crystal polymer or the like. The skin is just rigid enough to be manageable or manipulatable for placing in a tool, such as a mold 12. The mold has projections 14 for forming or receiving holes 16 in the skin. Larger projections 18 may be provided to receive or form bores 18 of the skin. The size, shape, configuration, apertures, etc. of the skin would depend upon the final composite structure to be formed. For instance, in the advanced composite structure context to which the invention is applicable, the composite structure may be quite detailed and intricate, as shown in the aforementioned application Ser. No. 191,250, now abandoned. The mold then is heated to thermoform skin 10 to the general exterior shape of the composite structure, as described. Under normal circumstances, two skins would be thermoformed to sandwich a core (described hereinafter) therebetween.

Figure 2:
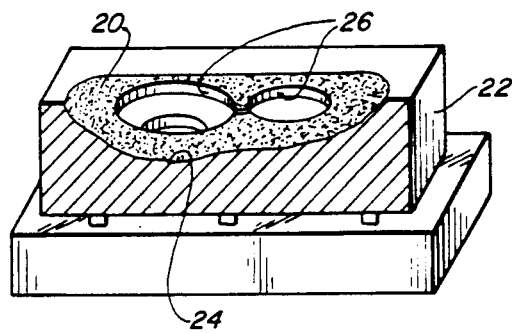
FIG. 2 is a somewhat schematic, perspective view depicting the step of injection molding a core for the structure.

The next step is to mold a core 20 (FIG. 2) by an injection molding process in a tool 22. The tool may be an appropriate injection mold, the lower half only being shown in FIG. 2, with a mold cavity 24 complementary to the mold cavity of tool 12 in FIG. 1. The core, of course, is molded with complementary bores 26, apertures or other features commensurate to fabricating the final composite structure. The foam core has a thermoplastic matrix complementary to the matrix of skin 10. For instance, a polyetheretherketone thermoplastic matrix might be used with both the skin and the core. The core could include a filler material, such as hollow glass microspheres. An appropriate core composition is shown in copending applicatin Ser. No. 153,332, filed Feb. 8, 1988, assigned to the assignee of this invention and which is incorporated herein by reference now U.S. Pat. No. 4,837,251.

Figure 3:
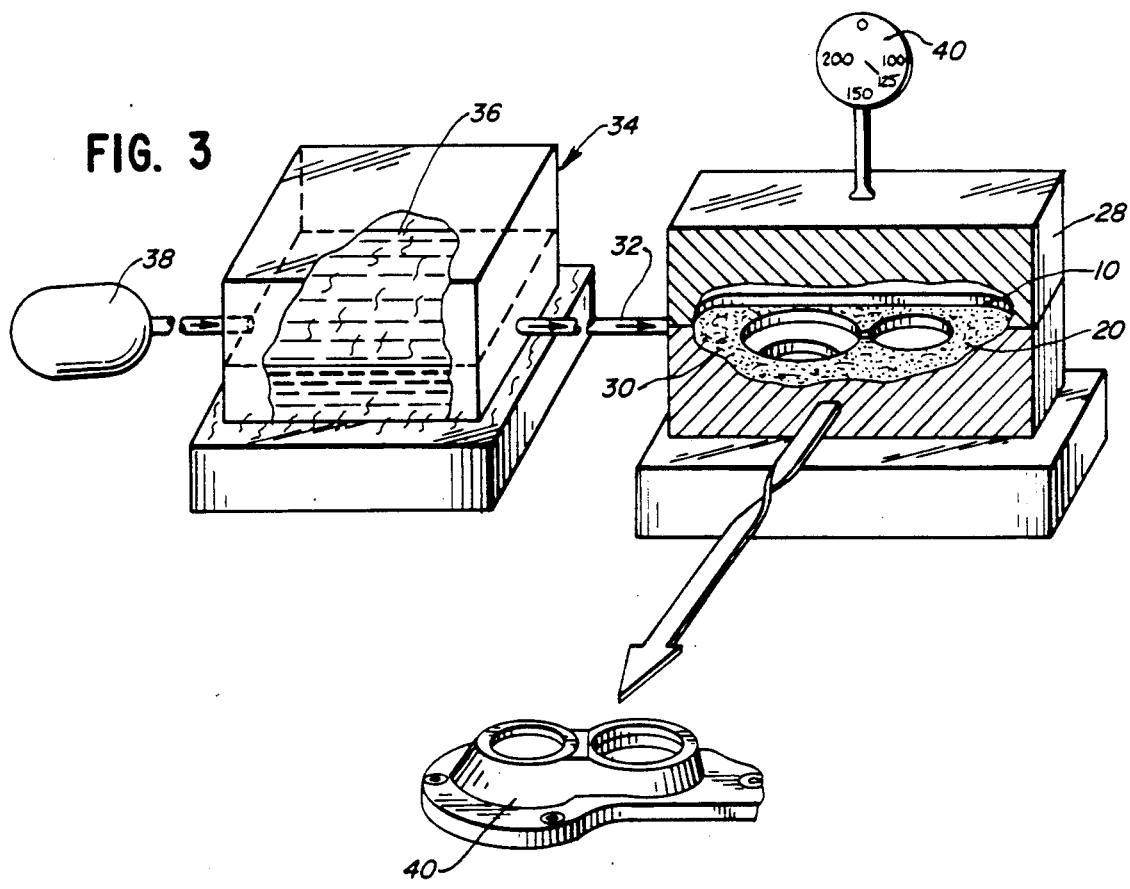
FIG. 3 is a somewhat schematic, perspective view illustrating the final forming procedure of injecting thermoplastic about the juxtaposed skin and core, under isostatic conditions with pressure and heat.

The method then includes a final forming procedure which is generally, schematically illustrated in FIG. 3 This step generally includes placing one or two skins 10 and core 20 in juxtaposition within a molding tool 28 which has a mold cavity 30 shaped to the final, dimensioned configuration of the finished composite structure. A thermoplastic material is injected into mold cavity 30, as through a conduit 32, of tool 28 under isostatic conditions and heat. Inserts (not shown) may be employed in the mold cavity as standoffs to maintain the skin spaced from the walls of the cavity. Very viscous materials may be used by providing additional positions of injection into the mold. In the most extreme case, very little flow of the material is required. In that case, the injected thermoplastic material acts primarily as a mechanism for application of the required consolidation pressure and temperature. Void content in the final structure can be very highly controlled by suitable application of pressure and temperature. This injected thermoplastic material may be reinforced or filled, as with glass fiber, graphite fibers, microballoons and other components which increase the strength or stiffness of the final structure. Alloyed or interpenetrating network (IPN) materials may also be used for the matrices of the skin 10 and the core 20.

More particularly, a resin chamber 34 is provided for containing a volume of the thermoplastic injecting material 36. The chamber is heated and a compressor or other motive force 38 may be used to force the thermoplastic resin material through conduit 32 into mold cavity 30. The entire mold cavity thereby is under a pressure condition which can be monitored, as at gage 40. In other words, an isostatic condition is created in mold cavity 30 so as to provide equal pressure around and throughout the skin(s) and core juxtaposed therewithin.

Thermoplastic injecting material 36 is complementary to the thermoplastic matrices of skin 10 and core 20. The material is effective to form the final composite structure 40 to very precise dimensions and would even provide a finished or smooth coating surface for the structure. By providing complementary thermoplastic matrices throughout the injected material, the skin and the core, a molecular bond is created throughout and between the components of the final composite structure. No adhesives or additional steps in the process are necessary to bond the skins to the core and, in fact, the molecular bonding creates a homogeneous structure which has no adhesion interfaces between the components of the composite structure as with prior art methods where skins, cores or other components are prefabricated and subsequently bonded together by adhesives or the like.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A method of fabricating a composite structure having at least one skin molecularly bonded to a core, comprising the steps of:
   providing a skin composed of reinforcing material and a thermoplastic matrix;
   thermoforming the skin to the general exterior shape of the composite structure;
   molding a core in a separate step independent of and separate from the thermoforming of the skin, into the general shape of the composite structure, the core having a thermoplastic matrix complementary to the matrix of the skin; and
   final forming the composite structure by placing the independently thermoformed skin and the independently molded core in juxtaposition in a forming mold and injecting a thermoplastic material into the mold under isostatic conditions, the thermoplastic material being complementary to the thermoplastic matrices of the skin and the core.

2. The method of claim wherein the reinforcing material of said skin is selected from the group consisting of graphite, glass, aramid and ceramic.

3. The method of claim 1 wherein said core matrix includes a filler material of microspheres.

4. The method of claim 1 wherein the reinforcing material of said skin is woven fibers.

5. The method of claim 1 wherein the reinforcing material of said skin is braided fibers.

6. The method of claim 1 wherein the reinforcing material of said skin is chopped fibers.

7. A method of fabricating a composite structure having at least one skin molecularly bonded to a core, comprising the steps of:
   providing a skin composed of fibrous reinforcing material and a thermoplastic matrix;
   thermoforming the skin to the general exterior shape of the composite structure;
   molding a core in a separate step independent of and separate from the thermoforming of the skin, into the general shape of the composite structure, the core having a thermoplastic matrix complementary to the matrix of the skin; and
   final forming the composite structure by placing the independently thermoformed skin and the independently molded core in juxtaposition in a forming mold and injecting a thermoplastic material into the mold under conditions of pressure and heat, the thermoplastic material being complementary to the thermoplastic matrices of the skin and the core.

8. The method of claim 7 wherein the reinforcing material of said skin is graphite fibers.

9. The method of claim 7 wherein said core matrix includes a filler material of microspheres.

10. The method of claim 7 wherein the reinforcing material of said skin is woven fibers.

11. The method of claim 7 wherein the reinforcing material of said skin is braided fibers.

12. A method of fabricating a composite structure having at least one skin molecularly bonded to a core, comprising the steps of:
   providing a skin composed of reinforcing fibrous material and a thermoplastic matrix;
   thermoforming the skin to the general exterior shape of the composite structure;
   molding a core in a separate step independent of and separate from the thermoforming of the skin, into the general shape of the composite structure, the core having a thermoplastic matrix complementary to the matrix of the skin; and
   final forming the composite structure by placing the independently thermoformed skin and the independently molded core in juxtaposition in a forming mold and injecting a thermoplastic material into the mold under isostatic conditions, the thermoplastic material being complementary to the thermoplastic matrices of the skin and the core.

13. A method of fabricating a composite structure having at least one skin molecularly bonded to a core, comprising the steps of:
   providing a skin composed of reinforcing material and a polyetheretherketone matrix;
   thermoforming the skin to the general exterior shape of the composite structure;
   molding a core into the general shape of the composite structure, the core having a thermoplastic matrix complementary to the matrix of the skin; and
   final forming the composite structure by placing the skin and the core in juxtaposition in a forming mold and injecting a thermoplastic material into the mold under isostatic conditions, the thermoplastic material being complementary to the thermoplastic matrices of the skin and the core.

14. A method of fabricating a composite structure having at least one skin molecularly bonded to a core, comprising the steps of:
   providing a skin composed of reinforcing material and a thermoplastic matrix;
   thermoforming the skin to the general exterior shape of the composite structure;
   molding a core into the general shape of the composite structure, the core having a polyetheretherketone matrix complementary to the matrix of the skin; and
   final forming the composite structure by placing the skin and the core in juxtaposition in a forming mold and injecting a thermoplastic material into the mold under isostatic conditions, the thermoplastic material being complementary to the thermoplastic matrices of the skin and the core.

15. A method of fabricating a composite structure having at least one skin molecularly bonded to a core, comprising the steps of:
   providing a skin composed of reinforcing material and a thermoplastic matrix;
   thermoforming the skin to the general exterior shape of the composite structure;
   molding a core into the general shape of the composite structure, the core having a liquid crystal polymer matrix complementary to the matrix of the skin; and
   final forming the composite structure by placing the skin and the core in juxtaposition in a forming mold and injecting a thermoplastic material into the mold under isostatic conditions, the thermoplastic material being complementary to the thermoplastic matrices of the skin and the core.

16. A method of fabricating a composite structure having at least one skin molecularly bonded to a core, comprising the steps of:
   providing a skin composed of reinforcing material and a thermoplastic matrix;
   thermoforming the skin to the general exterior shape of the composite structure;
   molding a core into the general shape of the composite structure, the core having a thermoplastic matrix complementary to the matrix of the skin; and
   final forming the composite structure by placing the skin and the core in juxtaposition in a forming mold and injecting a polyetheretherketone material into the mold under isostatic conditions, the polyetheretherketone material being complementary to the thermoplastic matrices of the skin and the core.

17. A method of fabricating a composite structure having at least one skin molecularly bonded to a core, comprising the steps of:
   providing a skin composed of fibrous reinforcing material and a polyetheretherketone matrix;
   thermoforming the skin to the general exterior shape of the composite structure;
   molding a core into the general shape of the composite structure, the core having a polyetheretherketone matrix; and
   final forming the composite structure by placing the skin and the core in juxtaposition in a forming mold and injecting a polyetheretherketone material into the mold under conditions of pressure and heat.

* * * * *